3,399,250
FILM COMPRISING POLYETHYLENE AND AN ETHYLENE-VINYL ACETATE COPOLYMER
Charles C. Kirk, Laurel, Razmic S. Gregorian, Silver Spring, and Frank X. Werber, Rockville, Md., assignors to W. R. Grace & Co., New York, N.Y., a corporation of Connecticut
No Drawing. Filed Mar. 12, 1963, Ser. No. 264,701
3 Claims. (Cl. 260—897)

ABSTRACT OF THE DISCLOSURE

This invention is directed to a composition for forming a printable, crosslinkable, oriented, heat-shrinkable film and the product resulting from incorporating into polyethylene an ethylene-vinyl acetate copolymer in a concentration of 10–50 percent along with 0.1 to 15 percent of a crosslinking agent.

---

This invention relates to a novel and useful composition of matter, a process utilizing the composition and the product resulting from the process. More particularly it is directed to a polyethylene composition, a film forming process employing said composition and the film product resulting from said process.

The chemical inertness of polyethylene, while advantageous in many respects is the primary cause of poor receptivity of inks and adhesives to polyethylene. This is especially detrimental to the commercial acceptability of polyethylene film in the packaging industry. To date, various methods have been advanced to improve the receptivity of polyethylene for printing inks. The initial work to advance the art centered on the use of special inks which showed improved adherence to polyethylene. See U.S. Patents 2,612,480 and 2,628,208. These processes had the problem of drying the ink sufficiently to eliminate offset and still meet commercially acceptable printing speeds. Another special ink is claimed in U.S. 2,715,363 which contains an infrared absorbing, heat-generating material. Radiations having a high intensity of infrared proportedly build up a heat pattern in the inked areas which softens the underlying polyethylene thereby adhering the ink to the polymer. Subsequent methods of improving printability included the use of an overprint varnish to protect printed polyethylene film surfaces. See Australian Application 7,788/55 to British Cellophane. A different approach to the printing problem were the various efforts, both chemical and physical, to change the receptivity of the polyethylene surface itself. One method taught, to increase printability, was the vapor phase chlorination under the influence of light. Still another method to improve printability is the oxidation of the surface with chromic acid and other oxidizing solutions. See U.S. 2,668,134, U.S. Re. 24,062 and Australian Application 7,789/55. Still another chemical means of alterning the surface of the polymer is taught by Wolinski in U.S. 2,715,075 wherein he discloses treatment of the polymer surface with ozone and a gaseous accelerator. U.S. 2,632,921 teaches a physical method of improving the printability of polyethylene which comprises subjecting the polymer surface to high temperatures while concurrently maintaining the bulk of the polymer at a low temperature. Hot air, hot combustion gases, or an open flame can be used to impart the high temperatures rendering the polymer printable. A still further physical method of rendering polyethylene printable is achieved by passing the polyethylene through an electrical field in a manner to obtain a rapid electron bombardment of the polymer surface. The aforementioned methods of improving printability all either have the drawback of requiring special costly inks or requiring additional steps in forming printable film.

It is an object of the present invention to provide a heat-shrinkable, crosslinked, biaxially oriented polyethylene film to which printing inks will adhere. A further object is to provide a heat-shrinkable, crosslinked, biaxially oriented polyethylene film which is printable without any further treatment after orientation. Other objects will become apparent from reading hereinafter.

These objects are accomplished by the present invention which provides a composition of matter comprising (A) polyethylene, (B) 10–50% by weight of said polyethylene of a copolymer of ethylene and vinyl acetate and (C) a crosslinking agent, preferably an organic peroxide.

The present invention also provides a process for forming a printable, crosslinked, biaxially oriented polyethylene film composition which comprises (1) forming a substantially homogeneous mixture of normally solid polyethylene, 10–50% by weight of said polyethylene of a copolymer of ethylene and vinyl acetate and a crosslinking agent; (2) shaping the mixture into a tube by extruding at temperatures sufficient to melt the polyethylene and the copolymer of ethylene and vinyl acetate but below the gel point of the mixture; (3) feeding the tube as it leaves the extruder into a curing zone maintained at temperatures sufficient to heat the tube to at least the decomposition temperature of the crosslinking agent and preferably provided with an inert atmosphere; (4) passing the tube through said zone at a rate sufficient to crosslink the tube in said zone, and (5) expanding the crosslinked tube by blowing under gaseous pressure or the "trapped bubble" technique and recovering the heat-shrinkable, oriented, crosslinked printable film produced.

The invention further provides the printable crosslinked product in the form of film from the aforementioned process.

The resultant film, due to its high shrink energy, strength, clarity and printability, make it especially useful for printable, shrink-fit packaging of various articles, e.g., foods such as meats. Thus, for example, it can be used to wrap hams, etc., followed by evacuation of the air between the film and the wrapped article, followed by heating the wrapped article to shrink the film tightly against the object, followed by printing on the film to identify the wrapped article.

The following examples are set down to illustrate the invention and are not to be deemed limiting in scope.

Throughout the instant invention the melt index (MI) was measured under the conditions specified in ASTM D–1238–52T.

The density of the polymer was measured under the conditions specified in ASTM D–1505–57T.

The percent gel content of the crosslinked film in the instant invention was measured by refluxing a weighed sample (approximately 0.5 g.) of film in a cellulose Soxhlet thimble in xylene (containing 0.3 weight percent 2,6-ditertiary-butyl-4-methyl-phenol commercially available under the trade name "Ionol" from Shell Oil Corp.) for 24 hours. The insoluble portion of the sample after drying was weighed to calculate percent gel as follows:

$$\text{Percent gel} = \frac{\text{weight insoluble sample}}{\text{total weight sample}} \times 100$$

The printability or ink adhesion was tested at room temperature, i.e., 25° C., by a pressure-sensitive tape test. The test consisted of stamping the cured, biaxially oriented film with a layer of red printing ink (L502 Red), allowing the ink to completely dry thereon and thereafter firmly pressing a ¾" wide strip of "Scotch" brand, pressure-sensitive cellophane tape over the inked area. On grasping one end of the tape and pulling it back at an angle of slightly less than 180°, the adhesion of the ink is adjudged by the amount of ink removed from the film under the taped section.

In the examples, unless otherwise noted, a Brabender Plastograph Model PL–V2, equipped with a recording unit for measuring changes in torque, was used for simple compounding or mixing of the polymer and copolymer with the crosslinking agent. In general the procedure followed was to fuse the polymer and copolymer at a temperature about 10–30° C. above the melting point of the polyethylene in the mixture for ten minutes at 30 r.p.m. At this point the cross-linking agent is added and mixing is continued for an additional 1–5 minutes to obtain a homogeneous dispersion in the mixture. For curing, samples of the mixture (approximately 12 g. in weight) were pressed for 20 minutes at 20,000 p.s.i. and 176° C. into films of 20 mil thickness using a Pasadena platen press. The samples were then removed from the press and cooled in air. Samples of the cured specimens were then used to calculate the percent gel content by the aforementioned xylene extraction method.

The cured film specimens were then biaxially oriented by reheating the cured film specimens to a temperature within 15° C. below and 30° C. above the melting point of the film, followed by expanding the heated film under a gaseous pressure, e.g., air trapped bubble technique or tentering device.

Example 1

31.5 gms. of commercially available polyethylene (density 0.91) and 3.5 gms. of a commercially available copolymer of ethylene-vinyl acetate (ethylene:vinyl acetate weight percent=67:33), having a density of 0.95, were milled on a Brabender Plastograph at a temperature of 130° C. until the mixture was molten, as evidenced by a constant torque reading. 1.4 cc. of a benzene solution containing 0.25 gms. of 2,5-dimethyl-2,5-di(t-butyl-peroxy) hexyne-3; i.e.,

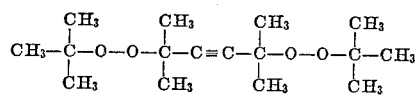

was added to the molten mixture and milling was continued for 5 minutes. The mixture was removed from the Plastograph and a 20 mil sheet thereof was cured on a platen press at 350° F. for 20 minutes at 40,000 p.s.i. The cured sheet had a gel content of 74%. A sample of the cured sheet was heated to 105° C. and blown under gaseous pressure, i.e., air to biaxially orient the sheet until it had a film thickness of 1.0 mil. The crosslinked, biaxially oriented film was stamped with a layer of red printing ink (L502 Red) and the ink was allowed to dry completely. A strip of ¾ width of "Scotch" brand, pressure-sensitive cellophane tape was pressed firmly over the inked area of the film. On removing the tape, by pulling it back from the inked area, at least 90% of the ink adhered to the crosslinked, biaxially oriented film.

In a control run using the same procedure as stated in Example 1 above, except that no copolymer of ethylene and vinyl acetate was blended with the polyethylene, only 15% of the ink adhered to the crosslinked, biaxially oriented polyethylene film on testing for adhesion.

Example 2

30 grams of commercially available polyethylene (density 0.91) and 10 grams of a commercially available copolymer of ethylene and vinyl acetate (ethylene:vinyl acetate weight percent=67:33) were milled until molten on a Brabender Plastograph at a temperature of 140° C., as shown by a constant torque reading. 1.6 cc. of a benzene solution containing 0.229 gram of 2,5-dimethyl-2,5-di[t-butylperoxy]hexyne-3 was added to the molten mixture and milling was continued for three minutes. The mixture was removed from the Plastograph and a 20 ml. sheet thereof was cured on a platen press at 350° F. for 20 minutes under 40,000 p.s.i. The cured sheet had a gel content of 63%. A sample of the cured sheet was heated to 105° C. and blown under air pressure to biaxially orient the sheet until it had a film thickness of 1.5 mils. The crosslinked, biaxially oriented film was stamped with a layer of red printing ink and the ink was allowed to completely dry. The adhesion of the ink was tested by firmly pressing a strip of ¾ width of "Scotch" brand, pressure-sensitive cellophane tape over the inked area of the film. On removing the tape from the inked area, the amount of ink adhering to the crosslinked, biaxially oriented film was at least 90%.

Example 3

26.25 grams of commercially available polyethylene (density 0.91) and 8.75 grams of a commercially available copolymer of ethylene and vinyl acetate (ethylene:vinyl acetate weight percent=67:33) were milled on a Brabender Plastograph at a temperature of about 140° C. until the mixture was molten. A 20 mil sheet of the molten mixture was pressed at 350° F. for approximately 6 minutes under 40,000 p.s.i. The resultant sheet was irradiated at room temperature with a dosage of 8 megarads. The thus irradiated sheet had a gel content of 60%. The cured sheet was heated to 105° C. and blown under air pressure to biaxially orient the sheet until it had a film thickness of 1.0 mil. The crosslinked, biaxially oriented film was stamped with a layer of red printing ink and the ink was allowed to dry completely. To test the adhesion of the ink, a strip of ¾ width of "Scotch" brand, pressure-sensitive cellophane tape was firmly pressed over the inked area of the film. On removing the tape from the inked area, at least 90% of the ink adhered to the film. This example demonstrates the ability to crosslink the printable polymeric mixture by irradiation.

Example 4

26.25 grams of commercially available polyethylene (density 0.96) and 8.75 grams of a commercially available copolymer of ethylene and vinyl acetate were milled at 150° C. until molten. 1.4 cc. of benzene solution containing 0.25 gram of 2,5-dimethyl-2,5-di[t-butylperoxy] hexyne-3 was added to the molten mixture and milling was continued for 3 minutes. The mixture was removed from the Plastograph and a 20 mil sheet thereof was cured on a platen press at 350° F. for 20 minutes under 20,000 p.s.i. pressure. The resultant sheet had a gel content of 64%. The sheet was heated to 130° C. and blown under gaseous pressure, i.e., air, to biaxially orient the sheet until it had a film thickness of 1.5 mils. The crosslinked biaxilly oriented film was tested for adhesion as in Example 1. On removing the tape, at least 90% of the ink remained adhered to the crosslinked, biaxially oriented film.

Example 5

29.25 grams of a high density ethylene-butene copolymer (2.0 weight percent butene, density 0.95, melt index 9.0) and 9.75 grams of a commercially available copolymer of ethylene and vinyl acetate (33 weight percent vinyl acetate), were milled on a Brabender Plastograph at a temperature of about 140° C. until the molten mixture was homogeneously blended. 0.286 gram of 2,5-dimethyl-2,5-di[t-butylperoxy]hexyne-3 in a benzene solution was added to the molten mixture and milling was continued for 5 minutes. The milled mixture was cured in the form of a 20 mil thick sheet in a platen press at 350° F. and 20,000 p.s.i. pressure during a 20 minute period. The resultant sheet had a gel content of 49%. The sheet was then heated to a temperature of 105° C. and Blown under gaseous pressure, i.e., air, to biaxially orient the printed sheet until it had a film thickness of 0.1 mil. To test the adhesion of ink to the cured oriented sheet, the sheet was stamped with a layer of red printing ink and the ink was allowed to dry completely. A strip of ¾ width "Scotch" brand, pressure-sensitive cellophane tape was pressed firmly over the inked area and thereafter removed by pulling it back from the area. At least 90% of the ink adhered to the sheet.

Example 6

Example 5 was repeated except that the ethylene vinyl acetate copolyer was present in the amount equal to 33% by weight of the blend. The cured sheet had a gel content of 66%. On testing the printability, it was found that at least 90% of the ink adhered to the film.

In a control run using the same procedure as stated in Example 6, except that no ethylene-vinyl acetate copolymer was blended with the ethylene-butene copolymer, 80% of the ink was removed from the film on testing for adhesion.

Another embodiment of the invention is described in the following examples whereby printable film is produced continuously.

Example 7

The polyethylene used was a commercially available low density (0.92) branched type made by the well-known high pressure process. The copolymer of ethylene and vinyl acetate used (ethylene:vinyl acetate weight percent of 67:33) had a density of 0.95 and is commercially available under the trade name "Elvax" 150. The peroxide used was 2,5-dimethyl-2,5-di(tert-butylperoxy) hexane of the formula:

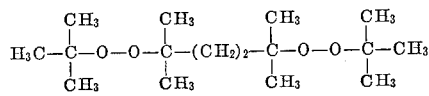

A solution of 30 grams of the peroxide in 200 cubic centimeters of petroleum ether was sprayed on pellets of the polyethylene and 25% by weight of polyethylene of the copolymer of ethylene and vinyl acetate in a twin-shell blender, so as to coat the pellets with about 0.75 weight percent peroxide.

The thus prepared homogeneous polyethylene-copolymer-peroxide mixture was then charged to a tube extruder. The tube extruder can be of any conventional design for the extrusion of polyethylene tubing. In this particular apparatus the material was screw-fed through a 1″ diameter heated barrel, 20 inches long, to a die face for one inch diameter tubing, 20 mils wall thickness. The extruder was maintained at temperatures of 245° to 300° F. (245° at the feed hopper to 300° at the die), and was operated so as to produce between 2½ and 6½ pounds of tubing per hour. Under these conditions premature crosslinking in the extruder barrel or die was held to a minimum (less than 2% gell formation).

The extruded tube was cured (crosslinked) by passing it upward through a furnace. The furnace interior can be several times the diameter of the tube, and 10 to 12 times as long. In this particular run the furnace interior was 3 inches I.D. and 12 inches long. Heating was by electrical resistance wire. The temperature inside the furnace was about 500° F. Residence time in the furnace was about 40 seconds. The interior of the furnace was continually flushed with preheated nitrogen to minimize oxidative degradation. These conditions give a gel content of the cured tube of about 60%, as determined by extraction of a sample in boiling xylene.

The temperature of the furnace is important. The temperature should be sufficiently high to provide rapid crosslinking, and yet not so high as to scorch the tube. Rapid crosslinking is essential, as the tube does not become self-supporting until it is crosslinked. For instance, under the conditions described in this example, the tube was only about ⅓ crosslinked (20% gel) at a furnace temperature of 300° F. and was very difficult to support on account of its low melt viscosity. Even at 350° F. there was still a slight flow. At a furnace temperature of 400° F., the tube became sulf-supporting, and approached maximum strength between 450° and 550° F. Above 550° F. there was evidence of scorching at normal furnace residence times.

The cured tube was expanded immediately in the next operation while still near its melting point. In some instances it may be desirable not to biaxially orient the cured tube in the same process. In these instances the cured tube is cooled and coiled up flat as tape to be biaxially oriented at a later date. In the instant example the tube was biaxially oriented by expansion immediately following the curing step.

To expand the tube, the trapped bubble technique was used. This technique is well-known, and is described, for example, in Kirk-Othmer, Encyclopedia of Chemical Technology, vol. 14, pp. 751–752. As applied to the instant operation, a 3 foot length of tube (at approximately the melting point of the polyethylene, i.e., 105° C.) was drawn up and pinched off between a first and a second set of rolls. This section contains nitrogen, air, or other inert gas under pressure. The gas can be added by syringe, and the syringe hole sealed with cellulose tape. As the tube advanced to the second set of rolls, the gas pressure expanded the advancing tube section into a bubble, which remained the same shape as the tube advanced continuously around it. Bubble expansion provided biaxial orientation of the resultant film. The ratio of bubble diameter to tube diameter can vary within wide limits, depending on the film thickness desired and the degree of stretching desired. A typical ratio is 5:1. Thus for a 1 inch diameter tube, the bubble diameter is generally about 5 inches and transverse stretching has a factor of five, so that (with no longitudinal stretching) a 20 mil tube is stretched to a film 20÷5 or 4 mils thick. If an equal amount of longitudinal stretching is desired, the take-up rolls on the far side of the bubble are run five times faster than the tube extrusion rate, so that the ultimate biaxially oriented film has a thickness of 20÷5÷5, or 0.8 mil.

In the instant example, biaxial orientation was accomplished by maintaining a ratio of bubble diameter to tube diameter of 5:1 and driving the take-up rolls on the far side of the bubble at a rate five times faster than the extrusion rate. The resultant printable, crosslinked, biaxially oriented film had a thickness of 0.8 mil. The film product was subjected to the aforementioned peel test to measure the adhesion of dry ink deposits. Less than 5% of the ink was removed with the pressure-sensitive tape.

A control run was made under the same conditions as set out in Example 7, except that no copolymer of ethylene and vinyl acetate was added to the feed mixture. On testing the crosslinked, biaxially oriented polyethylene film for adhesion of dry ink, an amount in excess of 80% of the ink was removed with the pressure-sensitive tape.

The tubular film so formed is either rolled up as made, or is cut at the edges and rolled up as flat film on two separate rolls.

Example 8

Example 7 was repeated except that no crosslinking agent was added to the polymeric mixture and instead of a furnace following the tube extruder, the extruded tube was quenched to a temperature in the range 20–60° C. and crosslinked within said temperature range by irradiation with a dosage of 10 megarads by means of a Van de Graaff electron accelerator. Various other apparati are operable to irradiate the tube and are well known to those skilled in the art. The irradiation can be performed at temperatures ranging from about room temperature up to the melting point of the polymer. The irradiation dosage should be sufficient to exceed the incipient gelation point, preferably a point at which the crosslinked infusible network is 10% gel. At this point a self-supporting tube is formed. Dosages in the range of 1 to 100 megarads are usually sufficient to exceed the incipient gelation point. The self-supporting, crosslinked tube was reheated to 105° C. and then oriented and tested for ink adhesion, as in Example 7. Less than 10% of the ink was removed from the crosslinked, biaxially oriented film by the ink adhesion test.

The homogeneous mixture of normally solid polyethylene resin, copolymer of ethylene and vinyl acetate and free-radical generating crosslinking agent can be formed in any suitable manner. One suitable method of blending comprises dissolving the crosslinking agent in a solvent inert to the polyethylene and copolymer (such as petroleum ether), mixing the solution in appropriate amounts with polyethylene and copolymer in resin, pellet or granule form and gradually heating the mixture to a temperature sufficient to evaporate the solvent but not so high as to decompose the crosslinking agent. In this method the resultant product comprises polyethylene and copolymer pellets or granules having a uniformly distributed surface coating of crosslinking agent. In another method the particulate polyethylene resin and copolymer and liquid or powdered crosslinking agent are dry-blended until the crosslinking agent is homogeneously distributed throughout the mass. As an example, polyethylene pellets (79.75% by weight), copolymer of ethylene and vinyl acetate (19.93% by weight) and 0.34% by weight liquid 2,5-dimethyl-2,5-di(tert-butylperoxy) hexane were blended into a homogeneous mass after twenty minutes at room temperature in a Patterson-Kelley twin shell blender. Polymer, copolymer and crosslinking agent can be very thoroughly mixed by fluxing the mixture on a two-roll mill or in a Banbury mixer at temperatures below the gel point of the admixture, if desired. This latter mode of mixing does not afford any significantly greater degree of homogeneity than that obtained by the dry-blending or solvent-blending methods previously described and thus will ordinarily be uneconomical.

In the process of this invention the crosslinking agent is used in an amount of from about 0.1 to about 15.0 percent by weight, based on the weight of the polyethylene resin. Preferred amounts of crosslinking agent are from about 0.5 to about 5.0 percent by weight, based on the weight of the polyethylene. Concentrations of crosslinking agent in the operable range have little or no detectable effect on extruder output rate when compared to polyethylene having no additive. The preferred concentration range gives the best combination of process economy and efficiency. It is also within the purview of this invention to add other known ingredients, e.g., pigments, dyes, fillers, stabilizers, etc., to the homogeneous mixture of normally solid polyethylene, copolymer of ethylene and vinyl acetate and crosslinking agent. In preparing shrinkable film for use in food packaging, it is generally unnecessary and often undesirable (because of possible toxicity or other physiological problems) to use additives other than the free-radical generating crosslinking agent.

In the second step of the process described herein the substantially homogeneous mixture of polyethylene, copolymer of ethylene and vinyl acetate and crosslinking agent is shaped into a tube by extrusion at temperatures sufficient to melt the polymer and copolymers but below about the gel point of the mixture. Preferably, the tube extrusion is accomplished in any of the well-known rotating screw extruders.

The term "gel point" as used herein means those temperatures at which there is sufficient decomposition of the crosslinking agent to cause gel formation in the polymer or copolymer. The gel point of any specific mixture depends upon numerous factors, including, e.g., the particular polyethylene, the particular ethylene-vinyl acetate copolymer and crosslinking agent, the amount of crosslinking agent, and the half-life of the crosslinking agent at various shaping temperatures. Since the gel point of any specific mixture is dependent upon so many factors, it is best determined by empirical methods, i.e., by extruding a small sample and observing or determining whether any gelled particles have been formed. As previously noted, the shaping step of the instant process must be accomplished with the formation of no more than about 2% (by weight) of gel. Thus, the term "gel point" is to be construed to include temperatures up to those which produce this result. Means for minimizing or avoiding gel formation during the shaping step include adjusting the temperature of the extruder barrel and die, adjusting the extruder output rate, varying the amount of crosslinking agent or changing the particular crosslinking agent used. Preferably, extrusion is accomplished with minimum back pressure by eliminating screen packs and the breaker plate and by using streamlined dies. When operating the extruder in this manner, there is little chance of any holdup in the high temperature zones or in the tubular die of the extruder which might cause premature crosslinking.

The tube comprising polyethylene and copolymer of ethylene and vinyl acetate with crosslinking agent substantially uniformly distributed therein is usually fed to the high-temperature curing zone by pulling upwards through the curing zone or gravity feeding in a substantially vertical downward direction. Feeding horizontally or in directions other than substantially vertical can be accomplished by the use of specialized equipment which will not physically mar or otherwise damage the hot extruded tube and which, at the same time, provides means for preventing the tube from collapsing upon itself. Because of the inherent simplicity in gravity "threading," it is preferred to extrude the tube downwards through the heated zone. In downward extrusion some necking of the tube may occur at or just below the extruder die tube before the tube is self-supporting. However, this minor drawback can be overcome by initiating curing of the tube as soon as possible after it leaves the extruder.

Curing of the extruded tube is accomplished by passing it through a heated curing zone; or a series of contiguous heated curing zones maintained at different temperatures. One very satisfactory heated zone is a tubular furnace brought to curing temperatures by means of electric resistance heaters. Other suitable heating apparatus will be apparent to persons skilled in the art. In any case, it is highly desirable and thus usually preferred to perform the curing step in an inert atmosphere in order to minimize oxidative degradation of the polymer and copolymer and/or retardation of the crosslinking reaction. One method of providing an inert atmosphere is to continually flush the heated curing zone with an inert gas (such as nitrogen, helium, argon or the like) which contains minimum amounts (preferably less than 50 parts per million) of oxygen impurity. The use of carbon dioxide as the inert flushing gas has been found to give especially interesting results in that it induces formation of carbonyl groupings in the end product film, thus increasing the printability thereof. One disadvantage of the use of carbon dioxide is that it inhibits to a slight degree the crosslinking action (as evidenced by lower gel content of the cured tube). This drawback is, however, alleviated by using higher concentrations of crosslinking agent than are used, for example, when the inert flushing gas is nitrogen.

At least a portion of the heated curing zone through which the extruded tube is passed (in order to effect crosslinking) is maintained at temperatures above that required to heat the tubing to the decomposition temperature of the crosslinking agent. As used herein the term "decomposition temperatures" means a temperature at which the crosslinking agent has a half life of less than about 1.0 minute, and preferably less than about 0.5 minute. There is no practical means for determining the exact temperature of the tube without damaging the same. Hence, the exact temperature to which the heated curing zone must be raised is determined by empirical methods. Sufficient guides for determining such temperatures are furnished by the specific example herein, and further adjustment to obtain optimum conditions will be immediately apparent to those skilled in the art after a cursory study thereof.

The tubing is passed through the heated curing zone at a rate which provides a residence time (at the decomposition temperatures) at least equal to three (3) half-lives of the curing agent, i.e., residence time is sufficient to decompose about 85% or more of the crosslinking agent. The term "residence time" as used herein is determined by use of the following equation:

$$\text{Residence time} = \frac{L_1}{\frac{L_2}{T}}$$

where $L_1$=length of the heated curing zone in which the tubing is above the decomposition temperature and $L_2/T$=the rate (in length per unit of time) at which the tube is withdrawn from the zone; and where $L_1$ and $L_2$ are expressed in the same units (e.g., meters, feet, inches, etc.). Required residence times are easily obtained by varying either the length $L_1$, or the rate at which the tube is withdrawn from the heated zone, or both.

Curing of the tube should be as rapid as possible so that the tube quickly becomes self-supporting (that is, so that it will not distort) after it leaves the extruder. The amount of cure needed to give this result cannot be precisely stated. For high molecular weight polyethylenes, curing to about 10% gel is sufficient. Up to 20% gel might be required in other cases. Temperatures and residence times necessary for rapidly achieving this degree of curing depend upon such variables as the temperature of the tube as it leaves the extruder die (i.e., how far below the gel point the shaped mixture is), the specific crosslinking agent or agents used, the amount of crosslinking agent(s), and so on. In order to minimize or preclude distortion of the tube, it will usually be preferred to feed the tube immediately as it leaves the extruder to the curing zone, and adjusting the conditions prevailing in the initial portion of the curing zone (that portion into which the extruded tube is first introduced) to provide at least about 20% gel within about 5 to 10 seconds or less. Curing can then be completed under the same conditions or at a slower rate under more moderate conditions, as desired.

Cured tubing produced in the manner described above has final gel levels of greater than about 20% by weight. Under optimum conditions percent gel ranges from about 50 to about 75% by weight. Percent gel, as reported in the examples, is determined by extraction of a sample of tubing weighing about 0.5 gram in a refluxing solution of xylene containing 0.3% by weight of 2,6-di(tert-butyl)-4-methylphenol for about 20 hours and then drying and weighing unextracted residue (gel). The weight of unextracted residue divided by the weight of the original sample is multiplied by 100 to calculate percent gel. Results of tests run on samples taken at various depths in the tube cross-section have shown that percent gel does not vary more than about 2%, indicating that crosslinking occurs in a uniform manner over the full cross section of the tube.

Cured tube issuing from the heated curing zone is cooled to a temperature below that at which it adheres to itself. The temperature to which the cured tube must be cooled depends upon the particular type (i.e., high or low density) of polyethylene therein, the degree to which the tube has been crosslinked, and other factors. It has been found that cured tubes of primarily low density (about .91 to .925) polyethylene should be cooled to below about 70° centigrade before coiled or otherwise mechanically or manually handled. High density polyethylenes (0.95 to 0.98) can be handled after cooling below about 100° centigrade. A particularly preferred method of cooling is by quenching in, e.g., a bath of inert liquid such as water. Quenching greatly increases the clarity of the film and product, thus enhancing its value as a packaging material. Other cooling methods such as air cooling, passing through cooling rings, etc., may be used if desired.

The cured and cooled tubing may be recovered and stored for later use or may be expanded immediately after cooling. In either case, the tube must be reheated to a temperature at which it will expand. These reheating temperatures depend primarily upon the type of polyethylene used to make the tubing. For low density polyethylenes, the expansion temperatures are between about 75° centigrade and about 130° centigrade, preferably from about 90° centigrade and about 110° centigrade, as is well known to the art. Expansion temperatures for cured high density polyethylene tubing are about 20° centigrade to about 30° centigrade higher than those containing primarily low density polyethylene tubing. As noted above, specific details of the process and apparatus used in the expansion of polyethylene tubing to form film are known in the art and hence they need not be repeated herein.

In the fully continuous process of this invention, the cured tubing is cooled as described above (preferably by quenching), immediately fed through a second heat exchange device (e.g., an infrared heater, a heated bath of inert liquid such as water, oil, mineral oil or a furnace, oven, etc.) where it is reheated to expansion temperatures and then between two pairs of pinch rolls where it is expanded by an inert gas to form tubular film.

Any of the various well-known types of polyethylene can be used in making film by the process of this invention. Such polyethylenes include the branched low-density (i.e., about .910 to about .925) material already described in Example I above, as well as the medium density materials and the newer linear high density (about .950 to .980) materials made by the Ziegler process ($TiCl_4$-Al alkyl catalyst) and the Phillips process (hexavalent chromia on silica-alumina support). The linear polyethylenes have melting points in the range of 120–137° centigrade and the copolymers of ethylene and vinyl acetate have melting points in the range 116–136° C. and therefore require peroxides (or other free-radical generating crosslinking agents) that provide gel points higher than these temperatures.

Crosslinking agents do not ordinarily have a sharp decomposition point, except possibly at very high temperatures. In the usual case, the agent requires several minutes to decompose substantially quantitatively, and the rate of decomposition at a given instant is generally proportional to the amount of material. Consequently, the decomposition rate for a given material at a given temperature can generally be determined by its half-life at that temperature. The half-life of any free-radical generating agent can be readily determined by one skilled in the art. In the case of peroxides, for example, the determination involved is described in Doehnert et al., Evaluation of Organic Peroxides on the Basis of Half-Life Data, Ann. Tech. Management Conf., Reinforced Plastics Div., Soc. Plastics Ind., Inc. 13, Sect. 1–B, 1–8 (1958); Chem. Abs. 53, 18534i (1959).

Free-radical generating crosslinking agents which can be used in the process of the instant invention include organic peroxygen compounds and azo compounds. Suitable organic peroxygen compounds include but are expressly not limited to dicumyl peroxide, tert-butyl perbenzoate, 2,5-dimethyl-2,5 - di - (tert-butylperoxy)hexane and 2,5-dimethyl-2,5-di-(tert-butylperoxy)-3-hexyne. Operable azo compounds include 2-phenylazo-2,4-dimethyl-valeronitrile, 2-phenylazoisobutyronitrile, 2-phenylazo-2,4,4 - trimethylvaleronitrile, 2 - phenyl-azoisobutyramide and the like.

The crosslinking agents can be used singly or in combination. It is only necessary that the "gel point" of the mixture be sufficiently high to enable shaping of the mixture in an extruder at temperatures above the melting point of the polymer and copolymer.

Crosslinking of the polymeric mixture of the instant invention can also be accomplished by high energy ionizing irradiation. When irradiation techniques are employed no free radical generating crosslinking agent need be added to the polyethylene and ethylene-vinyl acetate copolymer mixture. The methods of irradiation are well known to those skilled in the art and are discussed in a chapter by A. Charlesby in A. Renfrew's "Polythene," pp. 247–264, Interscience Publishers Inc., New York, 1957.

Another method of carrying out the instant invention especially suitable for continuous film forming is to admix the polyethylene and 10–50% copolymer of ethylene and vinyl acetate with or without the free radical generating crosslinking agent dependent upon whether chemical crosslinking or irradiation crosslinking is to be used. The mixture is then extruded in the form of a film about 2–20 mils thick. If chemical crosslinking is employed and a crosslinking agent was added to the mixture, the extrusion step is performed at temperatures below the gel point but at temperatures whereat the mixture is molten. The mixture is then passed through a furnace maintained at temperatures above the gel point of the mixture to effect a cure of the mixture.

The cured mixture is then biaxially oriented by stretching longitudinally at higher take-up speeds and laterally in a tentering device at temperatures ranging from 15° C. below to 30° C. or more above the melting point of the polyethylene. Such stretching and tentering procedures and devices are well known to those skilled in the art, see for example U.S. 2,866,231. Tentering and stretching techniques result in film having at least 4–8 times the surface area of the unstretched film, i.e., at least a doubling of the length and width of the unstretched film. Printing is applied to the crosslinked, biaxially oriented, heat-shrinkable film in a subsequent operation. If cross-linking is effected by irradiation, the polyethylene and 10–50% copolymer of ethylene-vinyl acetate mixture are blended and extruded in the form of film about 2–20 mils thick at molten temperatures, cooled to 20°–60° C. in a quench bath or air, and irradiated with sufficient high energy ionizing irradiation to obtain at least 10% gel in the mixture, preferable 20–75% gel. Radiation dosages in the range 1–100 megarads are sufficient to obtain the aforementioned percent gel content in the mixture. The thus crosslinked film is reheated to a temperature in the range 15° C. below to 30° C. or more above the melting point of polyethylene and biaxially oriented on a tentering device. Printing on the thus oriented film is accomplished immediately following cooling of the thus oriented film.

The weight percent of ethylene:vinyl acetate in the copolymer operable in this invention can vary between wide limits. An operable range includes 10 to 40 weight percent of vinyl acetate in the copolymer (balance ethylene) based on the weight of the copolymer.

The printable, crosslinked, oriented films of the present invention have a high elastic memory. On reheating the oriented film to its melting point, shrinkage up to 60% of the surface area can be obtained.

We claim:

1. A composition consisting essentially of normally solid polyethylene, 10–50% by weight of said polyethylene of a copolymer of ethylene and vinyl acetate, said copolymer containing 10 to 40 weight percent vinyl acetate based on the weight of the copolymer and 0.1 to 15% by weight of said polyethylene of an organic peroxide crosslinking agent.

2. The composition of claim 1 wherein the crosslinking agent is a member of the group consisting of dicumyl peroxide, 2,5-dimethyl-2,5-di-(tert-butylperoxy)hexane and 2,5-dimethyl-2,5-di(tert-butylperoxy)-3-hexyne.

3. A printable, cross-linked, oriented, heat-shrinkable film consisting essentially of normally solid polyethylene and 10–50% by weight of said polyethylene of a copolymer of ethylene and vinyl acetate, said copolymer containing 10 to 40 weight percent vinyl acetate based on the copolymer.

References Cited

UNITED STATES PATENTS

| | | | |
|---|---|---|---|
| 3,090,770 | 5/1963 | Gregorian | 260—897 |
| 3,117,946 | 1/1964 | Gorham | 260—897 |
| 3,099,860 | 8/1963 | Schippers | 264—209 |
| 3,108,851 | 10/1963 | Hofer et al. | 264—209 |
| 3,022,543 | 2/1962 | Baird et al. | 264—209 |
| 3,029,230 | 4/1962 | Strauss | 260—87.3 |
| 2,543,229 | 2/1951 | Chapman | 260—897 |
| 3,114,736 | 12/1963 | Bartl | 260—87.3 |
| 3,153,680 | 10/1964 | Giustiniani et al. | 260—874 |
| 3,182,101 | 5/1965 | Rees | 260—885 |
| 3,203,937 | 8/1965 | Breslow et al. | 260—897 |
| 3,256,366 | 6/1966 | Corbelli | 260—897 |
| 2,628,214 | 2/1953 | Pinkney et al. | 260—63 |
| 3,226,454 | 12/1965 | Marans et al. | 260—897 |
| 3,236,914 | 2/1966 | Murdock et al. | 260—897 |
| 3,248,359 | 4/1966 | Maloney | 260—897 |

FOREIGN PATENTS 937,807  9/1963  Great Britain.

MURRAY TILLMAN, *Primary Examiner.*

C. J. SECCURO, *Assistant Examiner.*